Figure 1:
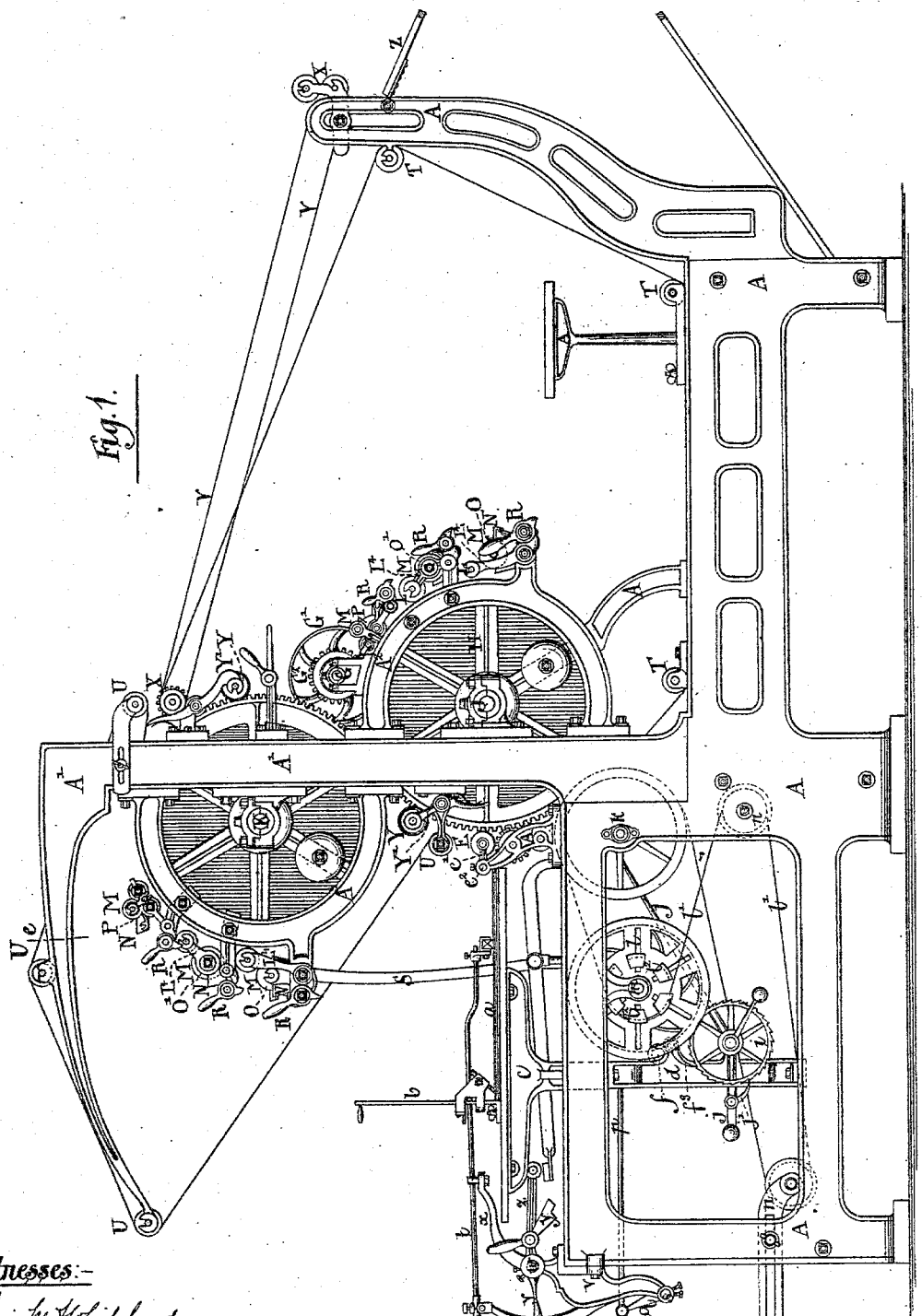

(No Model.) 5 Sheets—Sheet 1.

H. A. BRISSARD.
RULING MACHINE.

No. 286,382. Patented Oct. 9, 1883.

Witnesses:—

Inventor:—

(No Model.) 5 Sheets—Sheet 3.

H. A. BRISSARD.
RULING MACHINE.

No. 286,382. Patented Oct. 9, 1883.

Witnesses:—
Louis M. Whitehead.
Fred Haynes

Inventor:—
H. A. Brissard
by his Attorneys
Brown & Brown (No Model.)  H. A. BRISSARD.  5 Sheets—Sheet 4.
RULING MACHINE.

No. 286,382.  Patented Oct. 9, 1883.

Witnesses:—
Louis M. Whitehead.
Fred. T. Haynes.

Inventor:—
H. A. Brissard
by his Attorneys
Brown & Brown

N. PETERS, Photo-Lithographer, Washington, D. C.

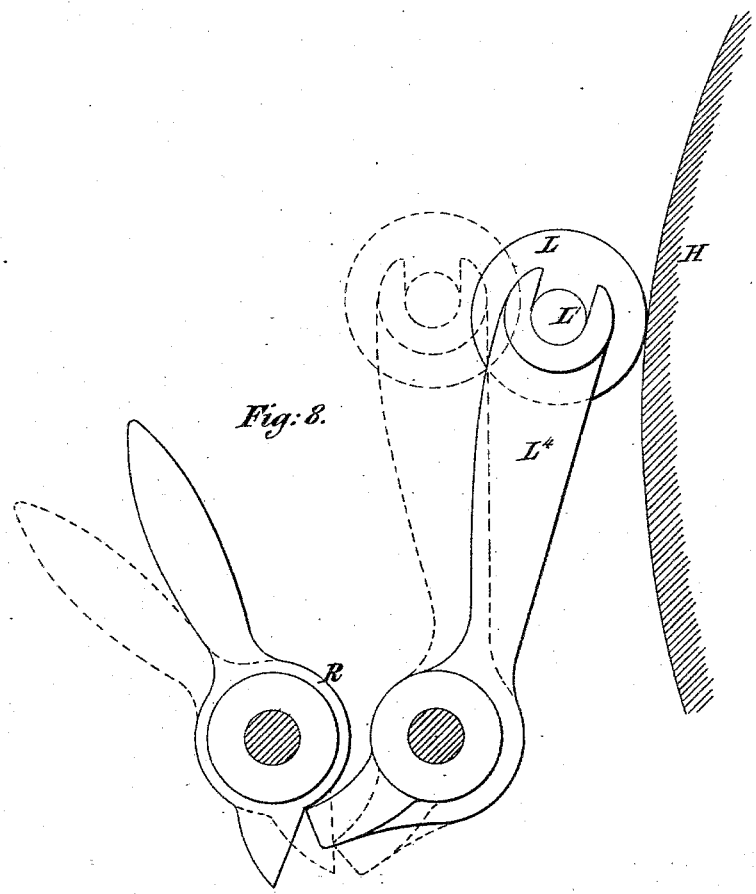

UNITED STATES PATENT OFFICE.

HENRI A. BRISSARD, OF PARIS, FRANCE.

RULING-MACHINE.

SPECIFICATION forming part of Letters Patent No. 286,882, dated October 9, 1883.

Application filed October 5, 1880. (No model.) Patented in France September 13, 1872, No. 96,574; in Belgium September 14, 1872, No. 31,200; in Austria-Hungary December 26, 1872, and in England May 3, 1879, No. 1,756.

*To all whom it may concern:*

Be it known that I, HENRI ADOLPHE BRISSARD, of Paris, in the Republic of France, have invented certain new and useful Improvements in Paper-Ruling Machines, of which the following is a specification, reference being had to the accompanying drawings.

This invention relates to the arrangement of machinery whereby sheets of paper can be ruled on one or both sides in several colors at a time, and either along the whole surface of the paper or on portions only thereof.

It also relates to an arrangement of automatic feed, whereby the paper is fed to the ruling mechanism.

The ruling mechanism prepared to rule on both sides of a sheet of paper consists of two supporting-drums, to carry the paper to be ruled, situate at different levels, and having their bearings on opposite sides of a pair of standards, which project from and form part of the main framing of the machine. These drums are geared together, and receive motion from the main driving-shaft.

The ruling-instruments consist of sets of disk-markers, which are supplied with ink from an ink-reservoir by means of inking-rollers rotating in the ink-reservoirs. The ruling apparatus for each drum is so supported as to overlie the supporting-drums. Each drum is similarly provided with a ruling apparatus containing sets of disk-markers. When more than one set of markers is used, it is preferred to drive the inking-roller of the first set by a band from the supporting-drum, the markers being driven by contact with the rollers. The second and other sets are driven by contact with the drums. All the sets of markers are provided with means for withdrawing them from contact with the paper on the drums, should occasion require, and the paper is held in position on the drums by means of tapes, in the usual manner. Each drum is provided with a cleaning-roller, to remove any ink that may be imparted thereto by careless working. The sheets of paper are fed to the drums by the automatic feed apparatus, in connection with and driven by one of the drums. The feed apparatus consists of a slotted table, upon which the sheets of paper are placed in a pile. This table has a vertical movement, in order to maintain the decreasing pile of paper at a uniform level. The said table is provided with a pair of vertical rods, which may be shifted to suit the size of the sheets of paper to be ruled, and these rods carry points or fingers, which rest upon the paper, and prevent more than one sheet being fed at a time to the supporting-drums. The paper is delivered to the drums by a pair of feed-rolls, which receive it through the action of a reciprocating pusher-bar. This pusher-bar is connected by means of rods to a pair of rock-levers keyed upon a cross-shaft, and rocked from a second shaft, which carries an extensible pulley, driven by a band from a pulley on the cam-shaft, before referred to. This extensible pulley is so arranged that its diameter can be readily increased or diminished, according to the size of the sheets of paper, so that the pusher-bar is worked to suit the varying sizes of paper used. The rotation of the drums is continuous, and the sheets of paper may be ruled from end to end of the paper; but when this is not required the one or more sets of ruling-markers may be thrown out of action, thus permitting of the paper being ruled on portions only of the sheets. The throwing out of action of the markers may be effected by a cam motion or by the adjustment of a hand-lever. The sheets of ruled paper are taken from the drums, and are deposited on a table by tapes suitably arranged for the purpose.

Figure 2:
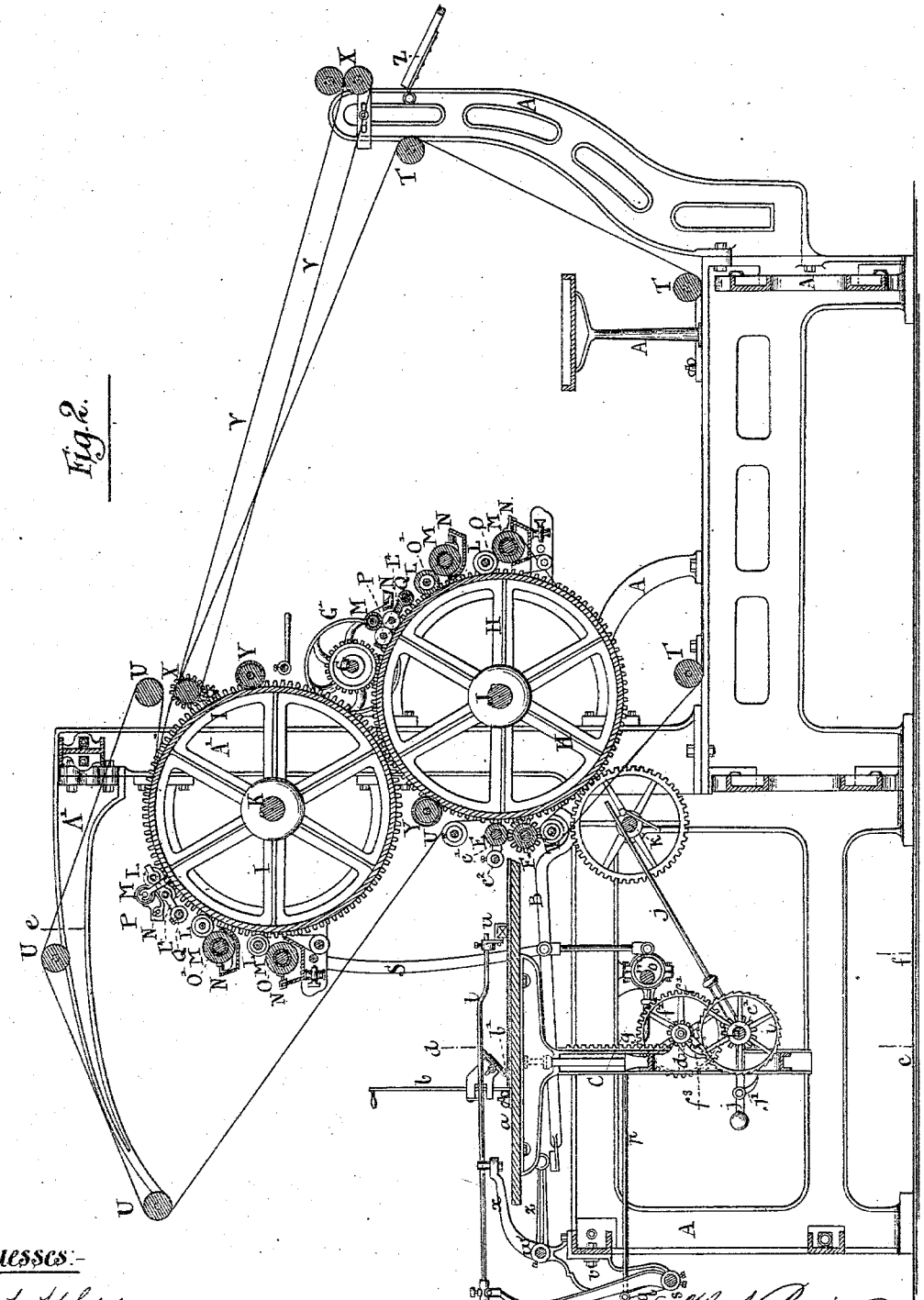
Figure 3:
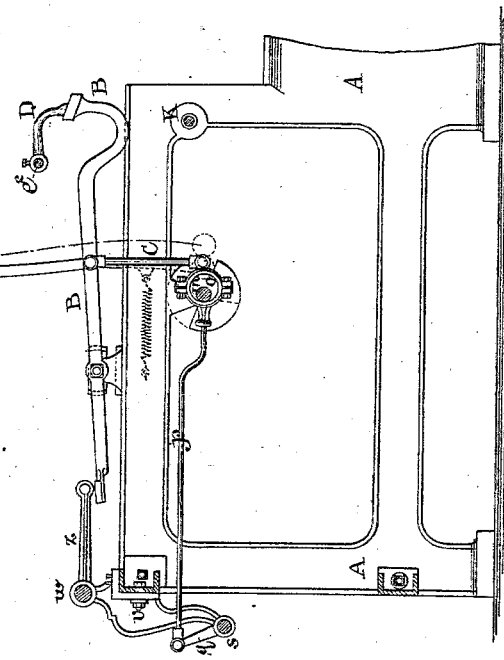
Figure 4:
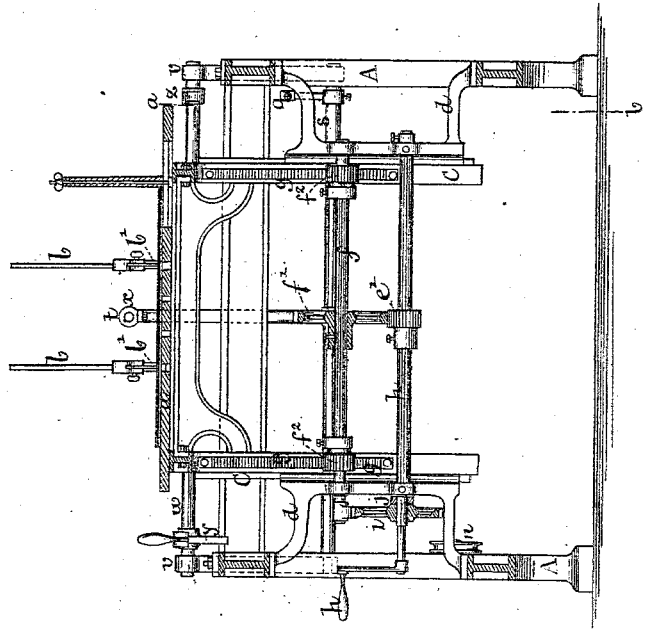
Figure 5:
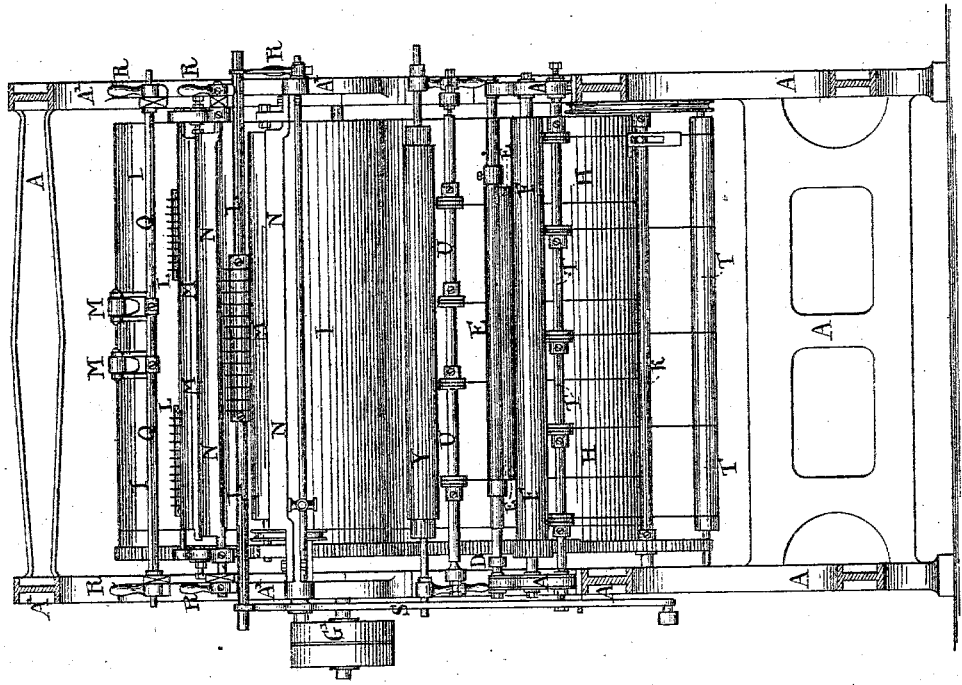
Figure 6:
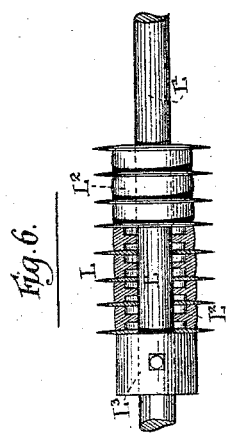
Figure 7:
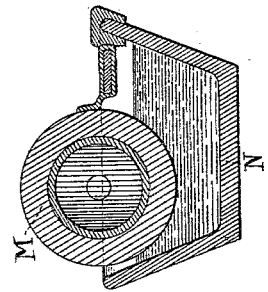
Figure 6:
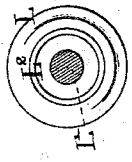

In the accompanying drawings, Figure 1, Sheet 1, is a side elevation of the machine. Fig. 2 is a longitudinal vertical section of the same. Fig. 3 is a longitudinal section of part of the feed mechanism, taken in the line *a b* of Fig. 1. Fig. 4 is a transverse vertical section taken on the line *c d* of Fig. 2. Fig. 5 is a transverse vertical section on the line *e f* of Fig. 2. Figs. 6 and 6* are detached views, on an enlarged scale and partly in section, of the ruling-instrument. Fig. 7 is a detached view, on an enlarged scale and in section, of the inking apparatus. Fig. 8 is a side view, on an enlarged scale, of one of the ruling-disks and its carrying-lever and a cam-lever for withdrawing the said disks from the paper, showing, also, a part of the profile of the drum to which said disks are applied.

A is the main framing of the machine, to which attached a pair of vertical standards, A' A'. These vertical standards carry at different levels the bearings J and K for the drums H I, which support the paper to be ruled. These drums H and I are geared together, and receive motion from the pinion G, keyed on the axle of the driving-pulley G'. This axle is mounted in bearings carried by arched brackets A², attached to the vertical standards A'. Each drum is provided with a separate set of ruling apparatus, that belonging to drum H being supported by the arched brackets A², and that belonging to drum I by the arched brackets A³ on the opposite side of the vertical standards A'.

L L are disks or ruling-instruments, mounted on an axle, L', (see Fig. 6,) with washers or spacing-pieces L², of any required width, between them, the whole being held securely together by a collar, L³, provided with a clamping-screw. Each set of ruling apparatus consists of three or more groups of ruling-instruments with attendant inking mechanism. The axles L' of the ruling-instruments L are mounted in forked bearings at the end of levers L⁴, pivoted to arms projecting from the arched brackets A² A³. By means of the handles and cams R, pivoted to the bracket-arms, the levers L⁴ can be rocked, as shown in Fig. 8, and thus the action of either of the ruling-instruments can be stopped instantly by hand. One of the levers L⁴ (see Fig. 1) of the lowest group of inking apparatus belonging to the drum I may be prolonged, as seen at S, Figs. 1, 2, 3, and 5, and its lower end provided with a bowl which bears against a cam on the shaft $m$, to be more particularly referred to hereinafter. By this arrangement the action of the ruling-instruments carried by this lever may be arrested automatically. The bracket-arms also serve to carry the inking apparatus, which consists of a roller, M, (see Fig. 7,) covered with india-rubber and suitably mounted in an ink-trough, N. On one end of the axle of the inking-roller M of the first or lowest group, O, in each set of ruling apparatus is mounted a V-pulley, to receive a band by which the roller is driven from its respective drum, and in turn drives its ruling-instruments.

The second group of ruling apparatus, O', is mounted in a similar manner to that just described, but is driven by friction of contact with its drum, and means are provided whereby only the exact quantity of ink or color required can be taken up by the inking-roller. This second ruling apparatus is especially intended for ruling in colors.

The third group of inking apparatus, P, whose office it is to rule the closest lines, is somewhat modified in form, the disk-markers for each line being in duplicate, with the inking-roller above them, the whole apparatus being carried by a pair of levers which have their fulcrum at Q. Each drum is thus similarly fitted with inking apparatus, and they are also provided with a cleaning-roller, Y, to remove any ink that may be imparted thereto by careless working. These rollers have their bearings at the end of rock-levers Y', pivoted to the vertical standards A', and are provided with springs, whereby the rollers are always kept in contact with their respective drums.

During the operation of ruling, the sheets of paper are directed in their course and held against the drums H and I by two series of tapes held in position by the rollers T and U. The series T holds the sheets of paper against the drum H, while the series U receives them as they leave this drum and conducts them round the drum I. They are then taken up again by the series T and passed on to another set of tapes, V, supported by the rollers X, and by these tapes the sheets are conducted to and piled upon a table, Z, behind the machine.

The sheets of paper are fed to the drum by an automatic feed apparatus in connection with and driven by the drum H. This feed apparatus consists of a slotted table, $a$, upon which the sheets of paper are placed in a pile. This table $a$ is provided with vertical rods $b$, capable of being adjusted in the slots by nuts or other suitable means to suit the size of the sheets of paper to be ruled, and these rods $b$ carry points or fingers $b'$, which rest upon the paper and prevent more than one sheet being fed at a time to the drum H. The table $a$ is mounted on a movable frame, $c$, provided with toothed racks $g g$, and sliding in guides $d$, which carry, also, the bearings for two shafts, $h$ and $f$.

Near one end of the shaft $h$ is mounted a ratchet-wheel, $i$, and at its center is keyed a pinion, $e'$, which takes into a gear-wheel, $f'$, on the shaft $f$. This shaft carries a pair of pinions, $f^2$, which take into the racks $g$ on the movable frame $c$, and this frame is also provided with a fixed pawl, $f^3$, for the ratchet-wheel $i$. The shaft $h$ is provided with a winch-handle, $h'$, whereby the working of the table $a$ may be effected by hand, if desired.

The table $a$, of which the initial position is regulated by the handle $h$, is so arranged that it may rise automatically during the working of the machine to an extent corresponding to the decrease in the pile of paper thereon. This movement is produced by means of the ratchet-wheel $i$, actuated by the pawl $j'$ on the lever $j$, which is worked by a cam on the shaft $k$. This shaft also carries at one end a toothed wheel in gear with the drum H, from which it receives motion, and at the other end a grooved pulley, which, by means of the extensible pulley $l$ and the cord $l'$, gives movement to the shaft $m$. This extensible pulley, by which a movement more or less rapid is given to the pusher-bar, is mounted on one end of the shaft or axle $m$, which has its bearings in the frame A, and is composed of two disks placed in juxtaposition. One of these disks has a series of radial slots, and each slot receives a segment of a grooved pulley, $l^2$, round which the cord $l'$ passes. The other disk is provided with a series of curved projections, which take into notches in the segments of the grooved pulley, which project through the slots, and by turning this disk to the right or left these segments are pushed out or drawn in, so as to increase or diminish the diameter of the extensible pulley. Two small tension-pulleys, $n\ n'$, are provided, the pulley $n$ being adjustable to take up the slack or let out the cord $l'$ as the diameter of the extensible pulley is diminished or increased. The shaft or axle $m$ carries at the opposite end to the pulley $l$ an eccentric, $o$, to which is attached by a strap the rod $p$. This rod $p$, by means of the rocking arms $q$ and $r$, keyed on the rock-shaft $s$, actuates the rod $t$, to which is attached the pusher-bar $u$. This pusher-bar $u$ is covered with india-rubber or other suitable soft but biting material, and is intended to rest on the paper and push it forward, sheet by sheet, into the bite of a pair of feed-rollers, E and F, which conduct the sheets of paper to the drum H. The roller E is mounted in swinging bearings $e'$, keyed to the axle $e^2$, on which is also keyed the bent arm D. This arm D (see Fig. 3) rests upon one end of a lever, B, to which a rising-and-falling motion is communicated by the rod C, actuated by the eccentric $o$. By this means the axle $e^2$ may be rocked and the roller E lifted off the paper, except at the commencement and the end of the sheet, so that each sheet may be placed on the drum H in a regular and uniform manner. The roller F and axle $e^2$ are mounted in bearings in a bracket connected to the frame A, and the roller F is provided with a gear-wheel, which takes into the toothed wheel on the drum H and is driven thereby. The rock-shaft $s$ has its bearings in the bracket $v$, attached to the frame A, and this bracket also carries the bearings of a second rock-shaft, $w$, to which is keyed, at its center, a bent arm, $x$, to form a guide and support for the pusher-rod $t$. The pusher-rod $t$ may be lifted off the paper during the return-stroke by the handle $y$, fixed to the axle $w$; or this raising of the rod $t$ may be effected automatically by means of the arm $z$, keyed to the axle $w$, and actuated by the lever B, before referred to.

What I claim as my invention is—

1. The combination, with the ruling disks L and their levers $L^4$, of the cams R and their handles, substantially as and for the purpose herein set forth.

2. The combination of the vertically-movable slotted feed-table $a$, the adjustable vertical rods $b$, and their attached points or fingers $d$, the shaft $m$, eccentric $o$, rod $p$, rock-shaft $s$, having arms $q\ r$, the rod $t$, and the india-rubber-faced pusher-bar, all substantially as herein described.

This specification signed this 16th day of August, 1880.

HENRI ADOLPHE BRISSARD.

Witnesses:
EUG. DUBOIS,
ALPH. REIS.